United States Patent
Gladysz

[15] 3,671,016
[45] June 20, 1972

[54] CABLE HOLD-DOWN DEVICE

[72] Inventor: Wiktor Gladysz, Dollard des Ormeaux, Quebec, Canada

[73] Assignee: Atlas Hoist & Body Inc., Montreal, Quebec, Canada

[22] Filed: March 31, 1970

[21] Appl. No.: 24,098

[52] U.S. Cl. .......................... 254/190, 242/158, 254/DIG. 11
[51] Int. Cl. .......................................................... B66d 1/36
[58] Field of Search ...................... 254/190, 191, DIG. 11; 242/117, 158, 158.2

[56] References Cited

UNITED STATES PATENTS

| 1,782,358 | 11/1930 | Lang | 242/158 |
| 1,973,446 | 9/1934 | Rosenquist | 242/158 |
| 2,348,987 | 5/1944 | Lock | 242/158 X |
| 3,554,327 | 1/1971 | Takamura et al. | 187/095 |

FOREIGN PATENTS OR APPLICATIONS

| 800,244 | 9/1950 | Germany | 242/158.2 |
| 639,774 | 11/1962 | Belgium | 254/DIG. 11 |
| 724,624 | 7/1942 | Germany | 242/158 |
| 1,128,691 | 1/1957 | France | 254/DIG. 11 |

*Primary Examiner*—Richard E. Aegerter
*Assistant Examiner*—Merle F. Maffei
*Attorney*—Alan Swabey

[57] ABSTRACT

A cable hold-down device comprising a frame which can be positioned to extend adjacent and about a portion of the circumference of a cable drum. The frame carries a rotatable pulley to press against the last section of cable wound on the drum. The frame rides on the drum and has means for biasing the pulley against the cable.

7 Claims, 4 Drawing Figures

PATENTED JUN 20 1972 3,671,016
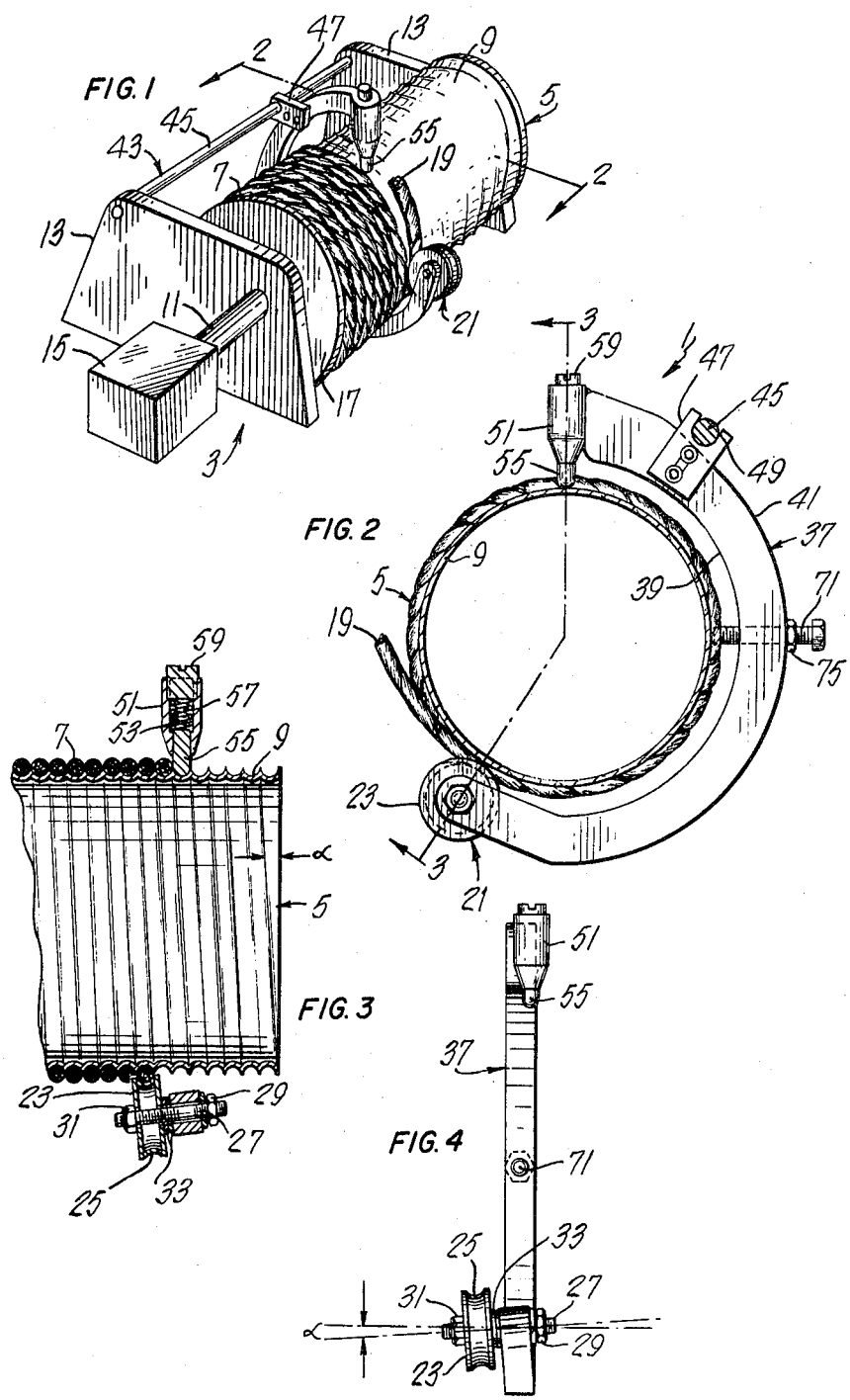
INVENTOR
Wiktor GLADYSZ
Alan Swabey
ATTORNEY 3,671,016

CABLE HOLD-DOWN DEVICE

BACKGROUND OF INVENTION

1. Field of Invention

This invention relates to a cable hold-down device.

More particularly, the invention relates to a cable hold-down device which can be placed in operative position adjacent a cable receiving drum forming a part of a winch, the device applying pressure on a section of the cable wound on the drum so as to maintain the cable on the surface of the drum when the cable is being wound on or off the drum under no-load conditions.

2. Description of Prior Art

In winding or unwinding cable on or off a drum, the cable, with little or no load on its free end, may not, due to the cable not being flexible or pliable enough, rest under its own weight against the surface of the drum. As a result, the cable may be wound loosely and may become snarled or tangled. To avoid this, a second operator is usually required, over and above the operator of the winch, in order to hold onto the free end of the cable and thus tension it as it is being wound or unwound so as to maintain the cable on the surface of the drum and thus prevent it from snarling.

SUMMARY OF INVENTION

It is the purpose of the present invention to provide a cable hold-down device which can apply pressure onto the cable as it is being wound or unwound on or off the drum so as to prevent the snarling of the cable and thus dispense with a second operator to tension the cable under no-load conditions.

In its broadest form, the invention relates to a cable hold-down device for use with a rotatable cable receiving drum, the device comprising a rotatable, cable pressing member for pressing against a cable wound on a cable receiving surface of the drum. Means mount the presser member so it is movable in a direction substantially parallel to the axis of rotation of the drum. Means also bias the presser member toward the drum so it presses against the last section of the cable wound on the drum with sufficient force to maintain all of the cable wound on the surface of the drum during winding or unwinding of the cable from the drum.

BRIEF DESCRIPTION OF DRAWINGS

The invention will now be described in detail having reference to the accompanying drawings, wherein:

FIG. 1 is a schematic view illustrating a preferred embodiment of the cable hold-down device mounted in an operative position adjacent the drum of a winch;

FIG. 2 is a cross-section view of the cable hold-down device in its operative position taken along line 2—2 of FIG. 1;

FIG. 3 is a partial cross-section view showing details of the cable hold-down device taken along line 3—3 of FIG. 2; and FIG. 4 is a front elevation of the cable hold-down device.

DESCRIPTION OF PREFERRED EMBODIMENT

The cable hold-down device 1, as shown in FIG. 1, is adapted to be used with a cable winch 3. The winch has a cylindrical drum or reel 5 onto which the cable is wound. The drum 5 can have a cable receiving path on its cylindrical surface. These means can comprise a helical groove 9 formed on the surface of the drum. The drum 5 is rotatably supported at its ends by a shaft 11 mounted in fixed brackets 13. The shaft 11 is connected to drive means 15 for rotating and braking the drum. Means (not shown) are provided for connecting one end of the cable 7 adjacent one end 17 of the drum 5. Rotation of the drum in one direction will cause the cable 7 to wind up onto the drum, with the cable following the helical groove and resting therein. Rotation of the drum in the other direction will cause the cable to unwind from the drum.

If the cable is resilient, and with little or no load applied to its free end 19, the cable may not lie in the groove on the drum. The cable hold-down device 1 is provided to press against at least the last section of the cable wound onto the drum to maintain the wound cable in the groove.

The device 1 includes a cable pressing member 21.

The pressing member 21 preferably comprises a pulley 23 which is rotatably mounted on an axis extending substantially parallel to the axis of rotation of the drum 5. The groove 25 in the pulley, as seen in cross-section, has a radium preferably slightly larger than the diameter of the cable. The pulley rides on and partially encloses the cable being wound onto the groove on the drum. The pulley 23 is rotatably mounted on bearings (not shown) so as to reduce the torque load on the pulley.

Means are provided for guiding the pulley 23 for movement in a direction substantially parallel to the axis of rotation of the drum 5 so the pulley can follow the last section of the cable on the drum as it is being wound or unwound off the drum. These guide means can include a rigid frame 37. The frame 37 has an inner surface 39 which faces the drum 5 when mounted in the operative position adjacent the drum 5 and an outer surface 41 facing away from the drum. Preferably, the frame 37 comprises a rigid bar of material, in the shape of an annular segment. When the frame is mounted in operative position adjacent the drum, it lies substantially in a plane extending perpendicular to the axis of rotation of the drum. The inner surface 39 of the frame has a radius somewhat larger than the radius of the drum 5.

The pulley 23 is mounted on the frame, preferably at one end by a short stub shaft 27. The shaft 27 is fixed to the frame at one end by a nut 29. The pulley 23 is rotatably mounted on the shaft 27 and held in place by a nut 31 and washers 33. The pulley projects inwardly from the inner surface 39 toward the drum when the frame 37 is mounted in operative position adjacent the drum.

The frame 37, in the operative position, is mounted to slide along a guide member 43, such as a rod 45, fixedly connected at its ends to the brackets 13 of the winch. The guide member 43 extends in a direction parallel to the axis of rotation of the drum. Preferably, the frame has an arm 47 intermediate its ends and projecting radially outwardly from the outer surface 41 of the frame. A radial slot 49 in the free end of the arm fits over the guide rod 45. This prevents rotation of the frame 37 relative to the drum and can also assist in guiding the frame 37, and thus the pulley 23, in a direction parallel to the axis of rotation of the drum.

Biasing means are provided to press the pulley 23 against the last section of cable wound on the drum. These biasing means are mounted on the frame 37 at the end of the frame opposite the end carrying the pulley 23, and project inwardly from the inner surface 39 of the frame toward the drum. The biasing means can include a radially extending socket 51 connected to the frame. Mounted in a chamber 53, in the socket 51, is a guide pin 55 which projects from the socket radially toward the drum. The pin 55 is biased toward the drum by a spring 57 in the chamber 53. An adjustable cap 59 closes the chamber 53 of the socket 51 to maintain the spring 57 and pin 55 in place. The free end of the pin 55 rests in the groove 9 of the drum 5 and follows the groove as the drum is rotated. The cap can be adjusted to vary the force exerted by the spring 57 on the pin 55.

In the preferred embodiment, the frame member 23 encircles between 200° and 250° of the circumference of the drum and, preferably, 225° of the drum circumference.

The preferred embodiment employs a second guide pin 71 for additionally positioning the frame 37 relative to the drum 5 and assisting the pulley 23 to press against the cable. The second guide pin 71 projects from the inner surface 39 of the frame toward the drum and is located intermediate the ends of the frame, preferably 135° from the pulley 23 and 90° from the first guide pin 55, the pulley and first pin being mounted on the ends of the frame. The second pin 71 also rides in the groove 9 on the drum. The second pin 71 can be threaded through a radial extending aperture in the frame, and thus adjusted as to the extent it projects from the inner surface 39 of the frame. The pin can be locked in the adjusted position by a locking nut 75. The pin 71, together with pulley 23 and first pin 55, provides a three-point support for the frame about the circumference of the drum, thus preventing its movement toward or away from the drum surface. However, the arm 47 is still required to cooperate with the guide member 43 to prevent the frame from rotating about the drum. The arm 47 is mounted between the pins 55 and 71.

In operation, when a cable is to be wound or unwound onto the drum with little or no load applied to the free end of the cable, the frame is mounted in operative position adjacent the drum with the slot 49 in the arm 47 fitting over the guide rod 45, as shown in FIG. 2. In this operative position, the pulley 23 bears against the last section of the cable in the groove adjacent its take-off or take-on point on the drum. The pins 55 and 71 ride in the helical groove 9 adjacent to the last section of the cable wound on the drum. The force exerted by the spring biased pin 55, and pin 71, moves the frame in a direction to pull the pulley 23 radially against the last cable section in the groove. When the drum is rotated, to unwind cable therefrom for example, the pins 55 and 71 track along the groove 9, thus assisting in moving the frame together with the pulley 23 tracking the cable in a direction parallel to the axis of rotation of the drum along the guide rod 45. As the frame moves, the pulley continually is pressed against the cable to maintain it under tension. The frame is prevented from rotating as it moves parallel to the drum by its connection to the rod 45.

The use of a frame extending about a substantial portion of the circumference of the drum, and with the pins 55, 73 and the pulley 23 spaced from each other on the frame as described, permits the use of a weaker spring 57 than that required if the frame were shorter or pin 73 were not used. The first and second reaction forces provided by pins 55, 73 combine vectorially to pull the pulley 23, through its connection with the frame, radially against the cable to press against it, with sufficient force, to maintain it on the drum surface.

The two-point contact of pins 55, 71 on one side of the drum permits the frame 37 and thus pulley 23 to swing slightly in an arc in a direction somewhat parallel to the axis of rotation of the drum about an imaginary axis joining the points of contact of pins 55 and 71 with the drum surface. This permits the pulley 23 to follow the cable while reducing side-thrust forces which might cause the pulley to jump the cable.

The first pin 55 and pulley 23, along with the second pin 71 are mounted on the frame so that their points of contact with the drum can be joined by a helical arc having the same pitch as the pitch of the helical groove on the drum.

Preferably, the pulley 23 is mounted on shaft 27 so that its axis of ration extends at an angle $\alpha$ from the axis of rotation of the drum. This angle $\alpha$ equals the pitch $\alpha$ of the helical groove on the drum and ensures better contact of the pulley with the cable and reduces binding. The mounting of the pulley in this manner can be achieved by bending the frame 37 so the end portion thereof carrying the shaft 27 and pulley 23 extends at an angle $\alpha$ to the remainder of the frame which lies in a plane which is transverse to the axis of rotation of the drum, as shown in FIG. 4.

The device 1 can be easily mounted in operative position about the drum by removing the pin 55 so as to provide clearance to slide the frame over the drum.

While the device has been described in connection with winding or unwinding cable, it can be used when rope or wire is being wound as well.

I claim:

1. A cable hold-down device for use with a winch of the type having a rotatable drum with a helical groove on its surface into which a cable is wound, said device comprising an open frame having first and second ends for partially encircling the drum in a plane substantially perpendicular to the axis of rotation of the drum, a grooved pulley rotatably mounted on said first end of the frame for riding on the cable wound in the groove to define the take-off point of the cable relative to the drum, first and second tracking means on the frame for tracking over the drum surface to move the frame in a direction substantially parallel to the axis of rotation of the drum during its rotation, biasing means on the frame for biasing the pulley radially inwardly against the cable on the drum, said first and second tracking means being located on said frame relative to the pulley and to each other to each apply a reactive force in an opposite direction to the spring biased pulley and to each other, one of the first and second tracking means comprising a guide pin movably mounted in the frame and extending radially from the frame toward the drum, said biasing means comprising a spring on the frame bearing against the guide pin, and a single guide on the frame cooperating with means on the winch for preventing rotation of the frame when the drum is rotated.

2. A device as claimed in claim 1, wherein the frame extends between 200° and 250° about the circumference of the drum, one of the first and second tracking means being mounted at the second end of the frame.

3. A cable hold-down device for use with a winch of the type having a rotatable drum with a helical groove on its surface into which a cable is wound, said device comprising an open frame having first and second ends for partially encircling the drum in a plane substantially perpendicular to the axis of rotation of the drum, a grooved pulley rotatably mounted on said first end of the frame for riding on the cable wound in the groove to define the take-off point of the cable relative to the drum, first and second tracking means on the frame for tracking over the drum surface to move the frame in a direction substantially parallel to the axis of rotation of the drum during its rotation, biasing means on the frame for biasing the pulley radially inwardly against the cable on the drum, said first and second tracking means being located on said frame relative to the pulley and to each other to each apply a reactive force in an opposite direction to the spring biased pulley and to each other, said first tracking means comprising a first guide pin mounted in a socket on the second end of the frame, spring means in the socket biasing the pin radially against the drum, and the second tracking means comprises a second guide pin spaced from the first pin and projecting from the inner surface of the frame, and a single guide on the frame cooperating with means on the winch for preventing rotation of the frame when the drum is rotated.

4. A device as claimed in claim 1, wherein said single guide comprises an arm extending from the outer surface of the frame which terminates in a free end, a slot located in the free end, the slot receiving a fixed rod on the winch which extends parallel to the axis of rotation of the drum.

5. A device as claimed in claim 3, wherein said single guide comprises an arm extending from the outer surface of the frame which terminates in a free end, a slot located in the free end, the slot receiving a fixed rod on the winch which extends parallel to the axis of rotation of the drum.

6. A device as claimed in claim 1, wherein the groove in the pulley has, in cross-section, a radius slightly larger than the radius of the cable.

7. A device as claimed in claim 3, wherein the groove in the pulley has, in cross-section, a radius slightly larger than the radius of the cable.

* * * * *